(12) United States Patent
Baltz et al.

(10) Patent No.: US 10,773,266 B2
(45) Date of Patent: Sep. 15, 2020

(54) SPRAY TOOL POWER SUPPLY SYSTEM AND METHOD

(71) Applicant: Carlisle Fluid Technologies, Inc., Scottsdale, AZ (US)

(72) Inventors: James Paul Baltz, Waterville, OH (US); Tait Russell Swanson, Houston, TX (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 567 days.

(21) Appl. No.: 15/364,197

(22) Filed: Nov. 29, 2016

(65) Prior Publication Data

US 2017/0151577 A1 Jun. 1, 2017

Related U.S. Application Data

(60) Provisional application No. 62/261,728, filed on Dec. 1, 2015.

(51) Int. Cl.
| | |
|---|---|
| *B05B 5/053* | (2006.01) |
| *F01D 17/10* | (2006.01) |
| *F01D 15/06* | (2006.01) |
| *B05B 5/00* | (2006.01) |
| *B05B 5/035* | (2006.01) |
| *B05B 5/16* | (2006.01) |
| *H01M 2/10* | (2006.01) |
| *H02J 7/02* | (2016.01) |

(52) U.S. Cl.
CPC ............ *B05B 5/0532* (2013.01); *B05B 5/005* (2013.01); *B05B 5/035* (2013.01); *B05B 5/16* (2013.01); *F01D 15/06* (2013.01); *F01D 17/105* (2013.01); *H01M 2/1022* (2013.01); *H02J 7/025* (2013.01); *H01M 2220/30* (2013.01)

(58) Field of Classification Search
CPC ....... B05B 5/0532; B05B 5/005; B05B 5/035; B05B 5/16; F01D 15/06; F01D 17/105; H02J 7/025; H01M 2220/30; H01M 2/1022
USPC .............................................. 239/690, 690.1
See application file for complete search history.

(56) References Cited

U.S. PATENT DOCUMENTS

| | | |
|---|---|---|
| 1,881,570 A | 10/1932 | Wolfgang |
| 4,030,665 A | 6/1977 | Koyama |

(Continued)

FOREIGN PATENT DOCUMENTS

| | | |
|---|---|---|
| CN | 202756029 U | 2/2013 |
| CN | 103733535 A | 4/2014 |

(Continued)

OTHER PUBLICATIONS

PCT International Search Report & Written Opinion for Application No. PCT/US2016/064278 dated May 4, 2017, 18 pgs.

(Continued)

*Primary Examiner* — Christopher S Kim
(74) *Attorney, Agent, or Firm* — Fletcher Yoder P.C.

(57) ABSTRACT

A system may include an electrostatic spray tool having a turbine generator configured to generate electrical power to electrostatically charge a spray. The spray tool also may include a controller configured to monitor the electrical power from the turbine generator and to instruct a gas supply to vary a gas flow to the turbine generator based on feedback received from one or more sensors.

26 Claims, 6 Drawing Sheets

(56) References Cited

U.S. PATENT DOCUMENTS

| | | |
|---|---|---|
| 4,219,865 A | 8/1980 | Malcolm |
| 4,290,091 A | 9/1981 | Malcolm |
| 4,290,291 A | 9/1981 | Burns |
| 4,309,871 A * | 1/1982 | Venema .................... F02C 9/28 417/43 |
| 4,377,838 A | 3/1983 | Levey et al. |
| 4,462,061 A | 7/1984 | Mommsen |
| 4,491,276 A | 1/1985 | Reeves |
| 4,531,536 A | 7/1985 | Kosarzecki |
| 4,605,993 A | 8/1986 | Zelina, Jr. |
| 4,782,276 A | 11/1988 | Guterman |
| 4,978,075 A | 12/1990 | Lind et al. |
| 5,063,350 A | 11/1991 | Hemming et al. |
| 5,093,625 A | 3/1992 | Lunzer |
| 5,131,598 A | 7/1992 | Hoogeveen, Jr. |
| 5,211,171 A | 5/1993 | Choromokos |
| 5,218,305 A | 6/1993 | Lunzer |
| 5,267,129 A | 11/1993 | Anderson |
| 5,353,995 A | 10/1994 | Chabert |
| 6,350,040 B1 | 2/2002 | Parker |
| 6,906,466 B2 | 6/2005 | Feng |
| 7,000,638 B2 | 2/2006 | Tseng et al. |
| 7,007,708 B2 | 3/2006 | Burke et al. |
| 7,303,149 B1 | 12/2007 | Huang |
| 7,926,748 B2 | 4/2011 | Altenburger |
| 8,025,243 B2 | 9/2011 | Charpie |
| 8,590,817 B2 | 11/2013 | Baltz |
| 10,135,290 B2 * | 11/2018 | Isfeldt ...................... G01V 1/38 |
| 2004/0251321 A1 | 12/2004 | Ye et al. |
| 2005/0284963 A1 | 12/2005 | Reedy |
| 2006/0219824 A1 | 10/2006 | Alexander et al. |
| 2008/0272150 A1 | 11/2008 | Hahn et al. |
| 2009/0224074 A1 | 9/2009 | Altenburger |
| 2013/0277462 A1 | 10/2013 | Baltz |
| 2013/0277463 A1 | 10/2013 | Baltz et al. |

FOREIGN PATENT DOCUMENTS

| | | |
|---|---|---|
| EP | 0847807 | 6/1998 |
| FR | 675417 A | 2/1930 |
| FR | 2082636 A5 | 12/1971 |
| JP | 2012011329 A | 1/2012 |
| WO | 2013158267 A1 | 10/2013 |
| WO | 2014055424 A1 | 4/2014 |
| WO | 2015126789 A1 | 8/2015 |

OTHER PUBLICATIONS

PCT Invitation to Pay Additional Fees for Application No. PCT/US2016/064278 dated Mar. 10, 2017, 9 pgs.

Canadian Office Action for CA Application No. 3,005,745 dated Feb. 19, 2019, 7 pgs.

Japanese Office Action for JP Application No. 2018-528325; dated Jul. 2, 2019; 3 pgs.

Chinese Office Action for CN Application No. 201680079611.7; dated Jun. 17, 2020; 9 pgs.

* cited by examiner

US 10,773,266 B2

SPRAY TOOL POWER SUPPLY SYSTEM AND METHOD

CROSS-REFERENCE TO RELATED APPLICATION

This application claims priority to and benefit of U.S. Provisional Patent Application No. 62/261,728, entitled "SPRAY TOOL POWER SUPPLY SYSTEM AND METHOD," filed Dec. 1, 2015, which is herein incorporated by reference in its entirety.

BACKGROUND

The present disclosure relates generally to spray tools, and, more particularly, to electrostatic spray tools.

Spray tools, such as electrostatic spray tools, may be used to spray a coating material onto a target object, such as an automotive vehicle. The electrostatics help to increase the transfer efficiency of the spray onto the target object. Unfortunately, the electricity used by the electrostatic spray tool may be delivered through a power cord, which limits mobility of the electrostatic spray tool and requires a local power source such as the power grid. Furthermore, any extra weight added onto spray tools reduces mobility and comfort in handling the spray tools, which can also cause reduced quality in the spray coating.

BRIEF DESCRIPTION

In certain embodiments, a system may include an electrostatic spray tool having a turbine generator configured to generate electrical power to electrostatically charge a spray. The spray tool also may include a controller configured to monitor the electrical power from the turbine generator and to instruct a gas supply to vary a gas flow to the turbine generator based on feedback received from one or more sensors.

In certain embodiments, a system may include a spray tool support module configured to support a spray tool. The spray tool support module may include a power supply comprising a plurality of blades coupled to a rotor-stator assembly having a plurality of windings. The spray tool support module also may include a controller coupled to the turbine generator, wherein the controller is configured to selectively operate the power supply in a turbine generator mode or a motor driven fan mode, a current control mode or a voltage control mode, a liquid spray mode or a powder spray mode, a sensor feedback control mode or a manual control mode, or any combination thereof.

In certain embodiments, a system may include a powder spray tool configured to receive a fluid flow and a powder flow, wherein the powder spray tool is configured to output a powder spray. The system also may include a turbine generator configured to generate electrical power via the fluid flow, wherein the turbine generator comprises an electrical generator drivingly coupled to a fluid driven turbine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

DETAILED DESCRIPTION

Figure 1:
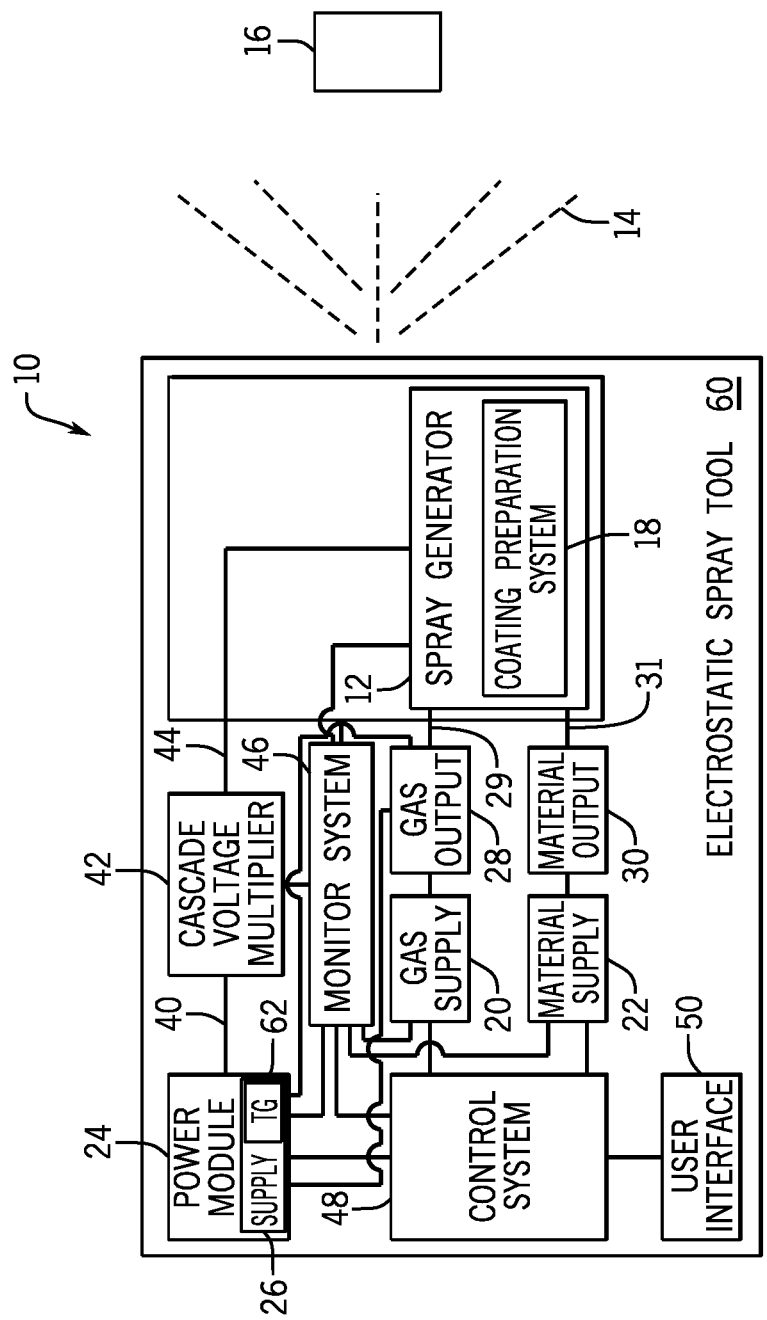
FIG. 1 is a block diagram of an embodiment of an electrostatic spray tool having a spray tool support module (e.g., a power module)

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure include an electrostatic spray tool system having a turbine generator (e.g., a turbine driven electrical generator) configured to supply electrical power to components of the electrostatic spray tool system. For example, in certain embodiments, a gas supply may direct a gas (e.g., air) to the turbine generator, thereby inducing rotation of a turbine coupled to a generator to generate electrical power. The turbine generator may be coupled to various electronic components within the electrostatic spray tool system, which receive the electrical power produced by the turbine generator. In certain embodiments, the turbine generator may be positioned within a power module (e.g., a turbine generator power module), which may be a standalone power module, an integrated power module that is fixedly coupled or one piece with spray equipment, a removable power module, or any combination thereof. The power module may be configured to removably or fixedly couple to the electrostatic spray tool (e.g., a spray gun), such as removably or fixedly coupling to a handle, a body, a barrel, a fluid connector, a fluid conduit, a gravity feed spray cup, a siphon cup, or any combination thereof. The power module also may be removably or fixedly coupled to a user wearable mount or clothing, such as a belt, coveralls, pants, shirt, jacket, vest, shoulder strap, backpack, fanny pack, arm band, safety helmet, or any combination thereof. The wearable mount may include a removable mount or strap, which may include Velcro couplings, hook and loop couplings, snap-fit couplings, magnetic couplings, buttons, or any combination thereof. The power module also may be removably or fixedly coupled to other tools or equipment, such as an air compressor, a compressed air tank, a compressed air conduit, a toolbox, a spray booth, a robotic arm or assembly having the spray tool, or other spray support equipment. The power module may include a variety of features to help improve mobility, control, and performance of the spray tool. For example, the power module may include weight reduction features, such as turbine blades and other components made of light weight plastics or composite materials (e.g., carbon fiber composites). The power module also may include or couple with a control system (e.g., a controller having a processor and memory), communications circuitry (e.g., wireless communications circuitry), sensors (e.g., flow rate sensors, voltage sensors, current sensors, proximity sensors, etc.), or any combination thereof. In some embodiments, the control system may be configured to monitor the output (e.g., current and voltage) of the turbine generator (e.g., via sensors) and to adjust associated equipment (e.g., the gas supply, the electronic components) based on feedback from the sensors. For example, the control system may determine that a cascade multiplier may utilize additional power, therefore the control system may send a signal to a compressor of the gas supply to increase the gas supply to the turbine generator, thereby enabling a greater amount of power generation from the turbine generator. Accordingly, the control system may monitor the electrostatic spray tool system and continuously adjust the power output from the turbine generator.

Turning now to the drawings, FIG. 1 is an embodiment of an electrostatic spray tool system 10, which includes a spray generator 12, configured to apply an electrostatically charged spray 14 (e.g., a liquid, a powder, a liquid/powder mixture) to at least partially coat an object 16. The electrostatically charged spray 14 may be any substance suitable for electrostatic spraying, such as liquid coating material or powder coating material (e.g., paint). Furthermore, the spray generator 12 includes a coating preparation system 18. As further illustrated in FIG. 1, the electrostatic spray system 10 includes a gas supply 20 (e.g., air supply), material supply 22, and a spray tool support module 24 (e.g., a power module 24). The power module 24 includes a power supply 26. In certain embodiments, the power supply 26 includes a turbine generator 62 (e.g., turbine driven electrical generator) fed by the gas supply 20. The gas supply 20 has a gas output 28 coupled to the spray generator 12 via a gas conduit 29. Similarly, the material supply 22 has a material output 30 coupled to the spray generator 12 via a material conduit 31. In certain embodiments, the coating preparation system 18 includes a powder mixing system, which uses the gas from the gas supply 20 to capture the powder from the material supply 22 to produce a material spray. However, in some embodiments, the coating preparation system 18 may include an atomization system, which uses the gas from gas supply 20 to atomize the material from the material supply 22 to produce a material spray. For example, the atomization system 18 may apply gas jets toward a material stream, thereby breaking up or atomizing the material stream into a material spray. In certain embodiments, the coating preparation system 18 may include a rotary atomizer (e.g., a rotary bell cup atomizer), a pneumatic atomizer, an airless or hydraulic atomizer, a nozzle, or another suitable atomizer. Additionally, the gas supply 20 may be an internal or external gas supply, which may supply nitrogen, carbon dioxide, air, another suitable gas, or any combination thereof. For example, the gas supply 20 may be a pressurized gas cartridge (e.g., $CO_2$ cartridge) mounted directly on or within the electrostatic spray tool system 10, or the gas supply 20 may be a separate pressurized gas tank or gas compressor (e.g., air compressor). In certain embodiments, the material supply 22 may include an internal or external material supply. For example, the material supply 22 may include a gravity feed container or cup, a siphon feed container or cup, or a pressurized material container or tank. The gravity feed container may be coupled to a top of the spray tool system 10 (e.g., at an input port), such that the material flows from the container into the spray tool system 10 via gravity. The siphon feed container may be coupled to a bottom of the spray tool system 10, which siphons or suctions the material from the container using the flow of gas (e.g., air) through the spray tool system 10. Further, the material supply 22 may be configured to hold or contain a liquid coating material (e.g., paint, stain, primer, clear coat, etc.), water, a powder coating, chemicals, biocides (e.g., insecticides and/or pesticides), disinfectant, medicine, or any other suitable material for electrostatic spray coating.

As further illustrated in FIG. 1, the electrostatic spray tool system 10 includes a power supply voltage 40, cascade voltage multiplier 42, and multiplied power 44. In certain embodiments, the power supply 26 may supply the power supply voltage 40 as an alternating current. The power supply 26 supplies the power supply voltage 40 to the cascade voltage multiplier 42, which produces some voltage (e.g., multiplied power 44) suitable for electrostatically charging a fluid (e.g., a liquid, a gas, a solid, or a combination thereof). For example, the cascade voltage multiplier 42 may apply the multiplied power 44 with a voltage between approximately 25 kV and 85 kV or greater to the spray generator 12. For example, the multiplied power 44 may be at least approximately 25, 30, 35, 40, 45, 50, 55, 60, 65, 70, 75, 80, 85, 90, 95, 100, or greater kV. As will be appreciated, the cascade voltage multiplier 42 may include diodes and capacitors, and, in certain embodiments, the cascade voltage multiplier 42 may be removable. In certain embodiments, the cascade voltage multiplier 42 may also include a switching circuit configured to switch the power supply voltage 40 applied to the spray generator 12 between a positive and a negative voltage. Further, spray generator 12 receives the multiplied power 44 to charge the material received from material supply 22. The current in multiplied power 44 may be low, on the order of approximately 10-100 microamps, so that the charge is essentially a DC static charge. The opposite charge may be created on the object 16 to be coated.

As also illustrated in FIG. 1, the electrostatic spray tool system 10 further includes a monitor system 46 and a control system 48, each of which may have one or more electronic components that may be powered by the power supply 26. The monitor system 46 and the control system 48 may separately or jointly include a processor, memory, and software code or instructions stored on the memory and executable by the processor to perform various monitor and control functions as discussed in detail below. The monitor system 46 may be coupled to the cascade voltage multiplier 42 and the spray generator 12 to monitor various operating parameters and conditions. For example, the monitor system 46 may be configured to monitor the voltage output of the power supply voltage 40. Similarly, the monitor system 46 may be configured to monitor the multiplied power 44 output by the cascade voltage multiplier 42. Moreover, in certain embodiments, the monitor system 46 may be utilized to monitor a mode of operation of the spray generator 12 and/or the coating preparation system 18. For example, the monitor system 46 may determine whether a cascade of the spray generator 12 is operating in a voltage control mode or a current control mode. Furthermore, the monitor system 46 may be configured to monitor the voltage of electrostatically charged spray 14. In some embodiments, the monitor may include an accelerometer that is capable of detecting an orientation of the electrostatic spray tool. Furthermore, the monitor system 46 may monitor various other indicators that indicate whether the electrostatic spray system 10 is in operation, such as trigger position, user's grip on the handle, material flow, orientation of the spray tool (e.g., device laying on its side not in use), or any other factor that may be an indication that a user is not spraying using the electrostatic spray system.

The control system 48 may also be coupled to the monitor system 46. In certain embodiments, the control system 48 may be configured to allow a user to adjust various settings and operating parameters based on information collected by the monitor system 46. Specifically, the user may adjust settings or parameters with a user interface 50 coupled to the control system 48. For example, the control system 48 may be configured to allow a user to select among a plurality of operational modes, such as a voltage control mode or a current control mode, a powder spray mode or a liquid spray mode, a material specific control mode (e.g., polymer, silicone, ceramic, paint, etc.), a target object control mode (e.g., automotive, medical, industrial, consumer products, etc.), a feedback control mode (e.g., auto adjustments based on sensor feedback of current, voltage, droplet size of spray, transfer efficiency of spray, distance to target object, environmental conditions (e.g., temperature, humidity, etc.), or any combination thereof. The control system 48 may include a user interface 50 having inputs and outputs, such as a display (e.g., touch screen display), buttons, dials, knobs, switches, indicator lights, or any combination thereof. The user interface 50 may, for example, include a power on/off switch, a start button, operational adjusters (e.g., voltage, current, gas flow, or gas pressure), mode selectors, operational displays (e.g., voltage, current, gas flow, or gas pressure), or any combination thereof. For example, the operational adjusters, such as voltage adjusters, current adjusters, and gas adjusters (e.g., airflow and/or air pressure adjusters), may have incremental or continuous adjustments of voltage, current, gas flow, and gas pressure. In certain embodiments, the control system 48 (including the user interface 50) may be removably or fixedly coupled to, integrated with, or part of the power module 24, the electrostatic spray system 10, or a combination thereof. In certain embodiments, the control system 48 and the power module 24 may be separate but communicatively coupled together, such as separate components removably or fixedly coupled to the electrostatic spray system 10. The control system 50 also may include wired communications circuitry and wireless communications circuitry, such as radio frequency (RF) communications circuitry, Bluetooth communications circuitry, or any other suitable communications circuitry. The communications circuitry of the control system 50 may enable the electrostatic spray system 10 and/or the power module 24 to exchange sensor data and control signals among one another and other spray equipment, such as an air compressor, a material supply tank, other electrostatic spray systems 10 in a spray booth, or any combination thereof.

Figure 2:
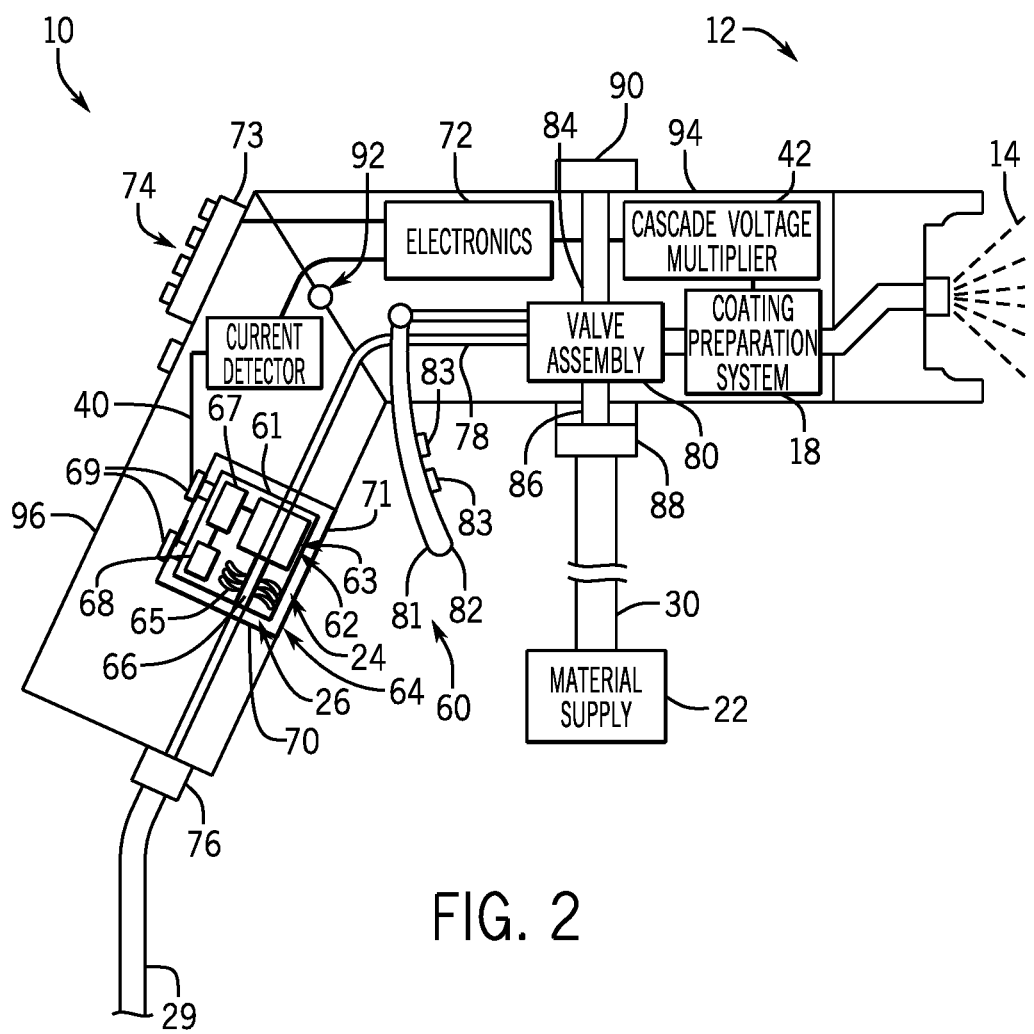
FIG. 2 is a schematic view of an embodiment of an electrostatic spray tool having a turbine generator.

FIG. 2 is a diagram of an embodiment of the electrostatic spray tool system 10 of FIG. 1, illustrating an electrostatic spray tool 60 (e.g., a liquid and/or powder spray tool, such as a spray gun). The electrostatic spray tool 60 has the spray generator 12, material supply 22 (e.g., liquid coating material, powder coating material, etc.), power supply voltage 40, and material output 30. The material supply 22 in the illustrated embodiment enters into the underside of electrostatic spray tool 60, but may be configured to enter electrostatic spray tool 60 in any suitable manner, such as by a gravity-fed container, material pump coupled to a material supply, siphon cup, pressurized material tank, pressurized material bottle, or any other suitable type of material supply system. Furthermore, the material supply 22 may be configured to be portable or in a fixed location. Additionally, the electrostatic spray tool 60 is configured to create the electrostatically charged spray 14.

As further illustrated in FIG. 2, electrical power is provided to the electrostatic spray tool 60 as power supply voltage 40 via the power supply 26 of the power module 24. As described above, in the illustrated embodiment, the power supply 26 includes a turbine generator 62 (e.g., fluid-driven turbine generator) configured to convert kinetic energy from at least a portion of the gas flow from gas output 28 into electricity. As shown, the turbine generator 62 includes an electrical generator 63 drivingly coupled to a fluid-driven turbine 64 having one or more stages of turbine blades 65 (e.g., first, second, and third stages of turbine blades) via a shaft 66. The turbine blades 65 are configured to rotate about a rotational axis 61 in response to fluid flow (e.g., gas flow or output 28) from a conduit 29, thereby driving the electrical generator 63 to rotate and generate electricity (e.g., power supply voltage 40). The gas flow from the gas output 28 may include air, inert gas (e.g., nitrogen), carbon dioxide, or any combination thereof. The power supply voltage 40 may be utilized to provide electrical power to various components of the electrostatic spray tool 60. In the illustrated embodiment, the power supply 26 also includes a power storage unit 67 and a controller 68. The power storage unit 67 may include one or more capacitors, rechargeable batteries, or any combination thereof. The power storage unit 67 is electrically coupled to the turbine generator 62 and is configured to store electricity for later use by the electrostatic spray tool 60, such as during periods of operation not using a gas flow through the turbine generator 62. The controller 68, which may include all or part of the control system 48, is configured to monitor and control operation of the spray tool 60.

In certain embodiments, the power storage unit 67 may be configured to provide power to the controller 68, the cascade voltage multiplier 42, electronics 72, and/or a motor-driven fan configured to provide on board air supply for the spray tool 60. In certain embodiments, the unit 62 may be a multi-function device that selectively operates as a turbine generator or a motor driven fan. For example, the unit 63 may be a motor-generator that selectively operates as a motor if an electrical current is supplied to the unit 63, e.g., via power storage unit 67, or selectively operates as an electrical generator if induced to rotate, e.g., via rotation of blades 65. By further example, the unit 64 may be a fan-turbine that selectively operates as a fan if driven to rotate by a motor, e.g., unit 63 in a motor mode, or selectively operates as a turbine if induced to rotate by a fluid flow, e.g., gas or airflow against the blades 65. In a motor mode of the motor-generator 63, the unit 63 may draw power from the power storage unit 67 and/or the power grid to cause rotation of the blades 65 (e.g., unit 64 in a fan mode), thereby forcing an air flow through the spray tool 60. In a generator mode of the motor-generator 63, the unit 63 may generate electricity due to gas flow (e.g., airflow) causing rotation of the blades 65 (e.g., unit 64 in a turbine mode), which in turn drive rotation of the shaft 66 and unit 63. During operation as a turbine generator, the unit 62 may provide power to the spray tool 60 and various components, while also charging or recharging the power storage unit 67. The controller 68 may be configured to selectively control the distribution of power from the turbine generator 62 to the power storage unit 67 and various electronics of the spray tool 60. For example, the controller 68 may be configured to control the power to the spray tool 60 within upper and lower thresholds of current and/or voltage, while directing any residual power to the power storage unit 67 for purposes of charging. During operation as a motor driven fan, the unit 62 may provide a suitable gas flow (e.g., airflow) through the spray tool 60 via power stored in the power storage unit 67, while the unit 67 may also provide power to other electronics in the spray tool 60 (e.g., controller 68, cascade voltage multiplier 42, electronics 72, etc.). In this manner, the unit 62 provides multiple functions while increasing the portability and flexibility of the spray tool 60. In view of the multiple modes and functionality of the unit 62, the power module 24 may be described as a spray tool support module, which is configured support the spray tool 60 by providing electrical power, fluid power (e.g., gas flow such as airflow), or a combination thereof. In other words, the power supply 26 having the unit 62 may be configured to supply power as electricity and/or fluid flow to the spray tool 60, and thus the power supply 26 is intended to cover both modes of operation of the unit 62 (e.g., turbine generator or motor driven fan).

The power module 24 (including the power supply 26) may be a removable unit, a fixed unit, or an integrated assembly relative to equipment, such as the electrostatic spray tool 60, the conduit 29, an upstream gas compressor or tank, a user mount or wearable structure or clothing (e.g., belt, fanny pack, backpack, shirt, jacket, pants, coveralls, etc.), or any combination thereof. Accordingly, the power module 24 may include one or more removable mounting features 69, such as one or more electrical/mechanical plugs that fit into receptacles, hooks that catch into slots, Velcro, snap-fit structures, latches, buttons, clamps, straps, friction fits or interference fits, or any combination thereof, between the power module 24 and the equipment. In certain embodiment, the power module 24 may be configured to removably couple to a plurality of different equipment, such as a family of spray tools 60, a family of wearable structures or clothing, or any combination thereof. For example, as illustrated in FIG. 2, the power module 24 may removably mount in a receptacle 70 in the spray tool 60, and may be removably covered by a cover 71. The cover 71 may be a hinged cover, a screw fastened cover, a snap-fit cover, or any combination thereof. The receptacle 70 and cover 71 also may include one or more seals or gaskets configured to seal the power module 24 inside the receptacle 70, thereby blocking any ingress of moisture, debris, or other contaminants.

As shown, the electrostatic spray tool 60 includes an electronics assembly 72 supplied with electrical power from power supply voltage 40. The electronics assembly 72 alone, or in combination with the controller 68, may include all or part of the monitor system 46 and/or the control system 48 described above. The electronics assembly 72 may be electrically coupled to a control panel 73. In certain embodiments, the control panel 73 may be included in the user interface 50 described above. For example, the control panel 73 may include buttons, switches, knobs, dials, and/or a display 74 (e.g., a touch screen), which enable a user to adjust various operating parameters of the electrostatic spray tool 60 and turn on/off the electrostatic spray tool 60.

The cascade voltage multiplier 42 receives electrical power (e.g., power supply voltage 40) from the power supply 26 (e.g., via the turbine generator 62) and supplies the multiplied power 44 to the spray generator 12. In certain embodiments, the multiplied power 44 may be preset to a certain approximate value (e.g., 45, 65, or 85 kV). Accordingly, in certain embodiments, the high voltage power (e.g., multiplied power 44) may be at least approximately 40, 50, 60, 70, 80, 90, or 100 kV. Some embodiments may utilize the control panel 73 to vary the high voltage power between an upper and lower limit. For example, in certain embodiments, the high voltage may be variable between approximately 10 to 200 kv, 10 to 150 kV, 10 to 100 kV, or any sub-ranges therein. Thereafter, the spray generator 12 uses the multiplied power 44 from the cascade voltage multiplier 42 to create a charge to produce an electrostatically charged spray 14.

As described above, with respect to the turbine generator 62, the illustrated electrostatic spray tool 60 receives the gas flow from the gas output 28 of the gas supply 20 through the gas conduit 29 coupled to a pneumatic adaptor 76 (e.g., a quick release conduit connector). In certain embodiments, the gas conduit 29 provides the gas flow from the gas output 28 (e.g., an air flow) to spray generator 12 for the atomization of electrostatically charged material spray 14, generation of electrical power via the turbine generator 62, and the like. Moreover, while the air flow was described above, in some embodiments, the gas flow from the gas output 28 may include an inert gas (e.g., nitrogen), carbon dioxide, atmospheric air, any other compressed gas, or a combination thereof. As shown, the electrostatic spray tool 60 further includes a gas passage 78, which extends from the adapter 76 through the spray tool 60 and the power supply 26 to a valve assembly 80. The valve assembly 80 may be further coupled to a trigger assembly 82, which may include a primary or main trigger 81 and one or more secondary or sub-triggers, buttons, or switches 83. As discussed below, the main trigger 81 may be configured to control various flows (e.g., gas flow, liquid flow, powder flow, etc.) through the spray tool 60 to generate a spray 14. The secondary triggers 83 may be configured to control other parameters of the spray tool 60, such as an operational mode, voltage, current, ratio of gas flow versus coating material flow, or any combination thereof. The secondary triggers 83 may be mechanical triggers, electrical triggers, wireless triggers, electrically wired triggers, or any combination thereof. These functions of the secondary triggers 83 are in addition to the primary functions of the main trigger 81 of the trigger assembly 82.

For example, the main trigger 82 of the trigger assembly 82 may be used to initiate a gas flow from the gas output 28 through the valve assembly 80. For example, certain embodiments of the main trigger 81 may open a valve in the valve assembly 80 to enable the gas flow from the gas output 28 through the spray tool 60 and the turbine generator 62. Further, the valve assembly 80 may be coupled to an upper material passage 84 and a lower material passage 86. In some embodiments, the upper material passage 84 may be configured to couple to a gravity feed supply (e.g., a gravity feed container or cup). As further illustrated in FIG. 2, the lower material passage 86 may receive material from the material supply 22 into the electrostatic spray tool 60 via a material adapter 88 through the material output 30. The electrostatic spray tool system 10 may also include a cap 90, which may be releasably secured to the electrostatic spray tool 60. In some embodiments, the cap 90 may be removed from the electrostatic spray tool 60 to instead secure a gravity feed supply (e.g., gravity feed container) covering and sealing the material passage 86.

During operation, when a user actuates the main trigger 81, gas flow initiates from the gas output 28 through the valve assembly 80. In addition, the actuation of the main trigger 81 initiates a fluid flow (e.g., liquid flow, powder flow, or both) from the material supply 22 through the valve assembly 80. The gas and fluid flows enter the coating preparation system 18. The coating preparation system 18 may include a cascade for electrically charging the spray 14. For example, the cascade may provide a charge to the spray 14 opposite the charge of the object 16. As a result, the quality of coating provided by the spray 14 may be increased. However, in some embodiments, the coating preparation system 18 may include an atomization assembly utilizing the gas from the gas output 28 to atomize the material supplied by the material supply 22. Moreover, the atomization assembly may include a pneumatic atomizer, a rotary atomizer, an airless atomizer, a chamber of passageways, a nozzle, or another suitable atomizer configured to atomize material for electrostatically charged spray. The spray generated by the atomization assembly passes through the spray generator 12 to generate the charged material spray 14. In certain embodiments, the electrostatic spray tool 60 may further receive an earth ground supply to comply with any relevant safety regulations. However, in some embodiments, the electronics assembly 72, turbine generator 62, and the like may be particularly designed to be intrinsically safe (e.g., comply with the standards of NFPA Class I Div. I) in areas having flammable or combustible materials.

The illustrated embodiment of the electrostatic spray tool 60 further includes a pivot assembly 92 between a barrel 94 and a handle 96 of the electrostatic spray tool 60. As will be appreciated, the pivot assembly 92 enables rotation of the handle 96 and the barrel 94 relative to one another, such that the user can selectively adjust the configuration of the electrostatic spray tool 60 between a straight configuration and an angled configuration. As illustrated, the electrostatic spray tool 60 is arranged in an angled configuration, wherein the handle 96 is angled crosswise to the barrel 94. The ability to manipulate the electrostatic spray tool 60 in this manner may assist the user in applying the electrostatic spray 14 in various applications. That is, different configurations of the electrostatic spray tool 60 may be more convenient or appropriate for applying the discharge in different environments or circumstances.

Figure 3:
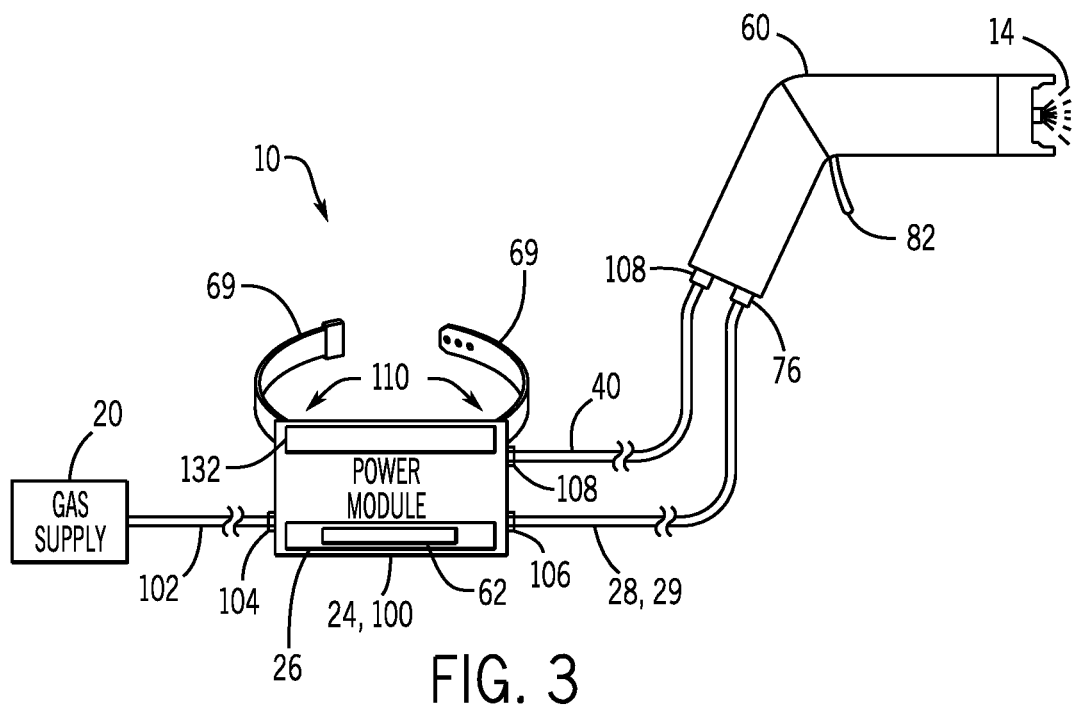
FIG. 3 is a schematic view of an embodiment of an electrostatic spray tool having a spray tool support module (e.g., a power module)

FIG. 3 is a schematic of an embodiment of the electrostatic spray tool system 10 of FIGS. 1 and 2, further illustrating an embodiment of the power module 24 having one or more mounting features 69. The electrostatic spray tool system 10 includes the gas supply 20, a power module 24, 100, and the electrostatic spray tool 60. As discussed in greater detail below when referring to FIG. 4, the power module 24, 100 receives a gas intake 102 from the gas supply 20 via a gas adapter 104. Also discussed below, the power module 100 supplies a gas flow from the gas output 28 via a gas adapter 106 and the power supply voltage 40 via an electrical adapter 108. The power module 24, 100 may further include a mounting portion 110 (e.g., mounting features 69) to allow the power module 100 to be mounted to an operator. The illustrated embodiment shows the mounting portion 110 as a strap (e.g., a belt), but the mounting portion 110 may also be configured to be at least a portion of a backpack, pouch, brackets, or some other suitable mounting features 69 for mounting portably or in a fixed location. As discussed in detail above when referring to FIG. 2, the electrostatic spray tool 60 discharges the electrostatically charged spray 14 while receiving the gas output 28 via the pneumatic adapter 76 and the power supply voltage 40 via the power supply 26 (e.g., the turbine generator 62). In the illustrated embodiment, the electrostatic spray tool 60 also has the trigger assembly 82 to initiate the flow of air through the gas output 28. Moreover, certain embodiments of the electrostatic spray system 10 may include a grounding circuit that has been omitted from FIG. 3 for clarity.

Figure 4:
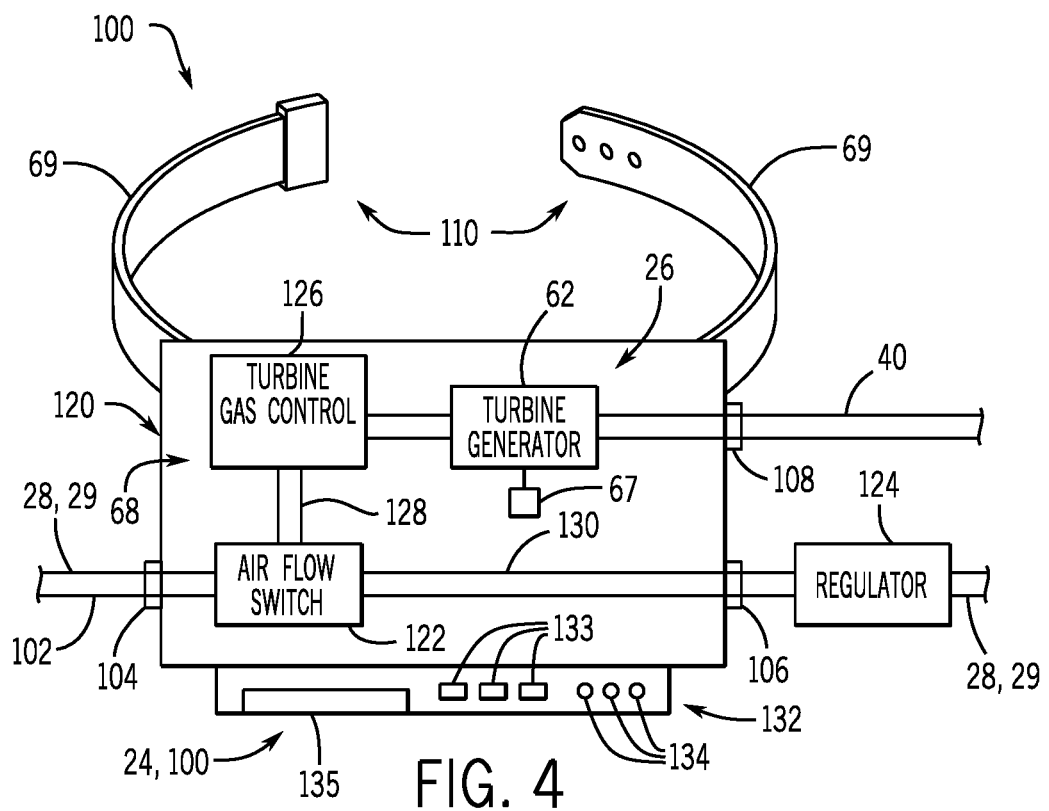
FIG. 4 is a schematic view of an embodiment of the power module of FIG. 3 having the turbine generator of FIG. 2.

FIG. 4 is a schematic of an embodiment of the power module 24, 100 of FIG. 3, further illustrating internal components. The power module 24, 100 includes the mounting portion 110 (e.g., mounting features 69 such as straps), a housing 120, a gas flow switch 122 (e.g., airflow switch), the turbine generator 62, and a gas regulator 124. The housing 120 may be rigid or flexible and any size suitable for use with the mounting portion 110. Further, the housing 120 may be configured to provide protection for internal components (e.g., the turbine generator 62) from contamination from sprayed paints or solvents. The turbine generator 62 may include a Pelton-type generator or some other suitable fluid driven generator (e.g., air-driven turbine generator). Further, the power module 24, 100 may also include a flow controller 126 to control air flow to the turbine generator 62. In some embodiments, the flow controller 126 may be incorporated into the control system 48, the controller 68, or a combination thereof. Moreover, in certain embodiments, the flow controller 126 may include a regulator that reduces a rate of flow of air into the turbine generator 62 to a preset pressure suitable for use with the turbine generator 62 for obtaining the desired level of power in the power supply voltage 40. In some embodiments, the regulator of the flow controller 126 may be omitted by instead relying on the turbine generator 62 to limit voltage output by some internal limiting capability (e.g., power limiting circuitry). For example, the turbine generator 62 may internally limit its output voltage to the desired level for the power supply voltage 40. Therefore, the turbine generator 62 may receive an unregulated air flow directly from a turbine gas intake 128, while supplying a constant desired voltage. In either of the above embodiments, the power supply voltage 40 is limited to a desired level desired to provide sufficient power to the cascade voltage multiplier 42 of FIGS. 1 and 2. In certain embodiments, the gas intake 102 may be sufficient to supply adequate air pressures to both the turbine generator 62 and the gas output 28. Accordingly, the gas intake 102 may be under a pressure of at least approximately 3 5, 40, 45, 50, 55, 60, 65, or greater psig. In the illustrated embodiment of the gas flow switch 122 receives the gas intake 102 and directs at least a portion of the gas intake 102 to the turbine gas intake 128 and at least a portion of the gas intake 102 to the an output 130.

In the illustrated embodiment, the output 130 directs the air flow to the regulator 124, which is configured to regulate air flow to the gas output 28. In the illustrated embodiment, the regulator 124 is positioned outside the housing 120. Some embodiments are configured to position the regulator 124 within the housing 120, as a portion of the housing 120, or, alternatively, within the spray tool 60 of FIG. 2. The regulator 124 may restrict the air pressure provided to the gas output 28 to a range suitable for spraying the electrostatically charged spray 14 of FIGS. 1-3. The regulator 124 may be a preset or adjustable air regulator configured to allow the user to select the pressure of the gas output 28 suitable to a particular application. The variables affecting the suitability of certain pressure in the gas output 28 may include the distance of the spray tool 60 of FIG. 2 from the object 16 of FIG. 1, atomization performance, spray characteristics, user preference, and/or the properties of the desired coating material. When air flow exits the housing 120 (e.g., the gas output 28), it may do so via the gas adapter 106.

In the illustrated embodiment, the power module 24, 100 includes a user interface panel 132 having one or more inputs 133, indicators 134, and displays 135. The inputs 133 may include selector dials, toggle switches, buttons, sliding selectors, level adjusters, digitizer pads or touch screens, or any combination thereof. The indicators 134 may include audio and/or visual indicators, such as speakers and lights (e.g., light emitting diodes, bulbs, etc.). The displays 135 may include liquid crystal displays (LCDs), touch screen displays, or any combination thereof. Thus, the user interface panel 132 may display and/or indicate various operating parameters of the spray tool system 10, such as voltage, current, gas flow rate (e.g., air flow rate), level or percentage of coating material remaining, flow rate of coating material, level of stored power in power storage unit 67, environmental conditions (e.g., temperature, humidity, or air quality), distance between spray tool 60 and a target object, angle of spray tool 60 relative to a surface of the target object, or any combination thereof. In addition, the user interface panel 132 may enable user adjustments and/or automatically controlled adjustments (e.g., via controller 68) of various operating parameters of the spray tool system 10, such as voltage, current, gas flow rate (e.g., air flow rate), flow rate of coating material, a desired distance between spray tool 60 and the target object, a desired angle of spray tool 60 relative to the surface of the target object, or any combination thereof. For example, the user interface panel 132 may enable user selection of a manual operating control mode, a sensor feedback based control mode by the controller 68, a pre-set operating mode via the controller 68, or any combination thereof. The user interface panel 132 also may enable user selection of a voltage control mode or a current control mode, a liquid spray mode or a powder spray mode, or any combination thereof. In certain embodiments, the indicators 134 and/or the display 135 may be configured to provide a notification to the operator indicative of a mode of operation of the power module 24, 100 and/or the spray tool 60. For example, the indicators 134 may be lights (e.g., light emitting diodes, bulbs, etc.) having different colors to indicate the current mode of operation the power module 100. For example, the indicators 134 may be green while the turbine generator 62 is supplying power to the spray tool 60, yellow while the power module 100 is improperly installed on the spray tool 60 (e.g., misaligned, unsecured, etc.), and red while the turbine generator 62 is not producing power. By further example, different colors of indicators 134 may indicate a voltage control mode, a current control mode, or a combined voltage and current control mode. By further example, different colors of indicators 134 may indicate a liquid spray mode or a powder spray mode, an electrostatic mode or a non-electrostatic mode, a battery powered mode (via power storage unit 67) or an electrical generation mode (e.g., via turbine generator 62), a manual control mode or a sensor control mode, or any combination thereof. Accordingly, the operator may quickly identify the mode of operation of the power module 100 while using the spray tool 60.

Figure 5:
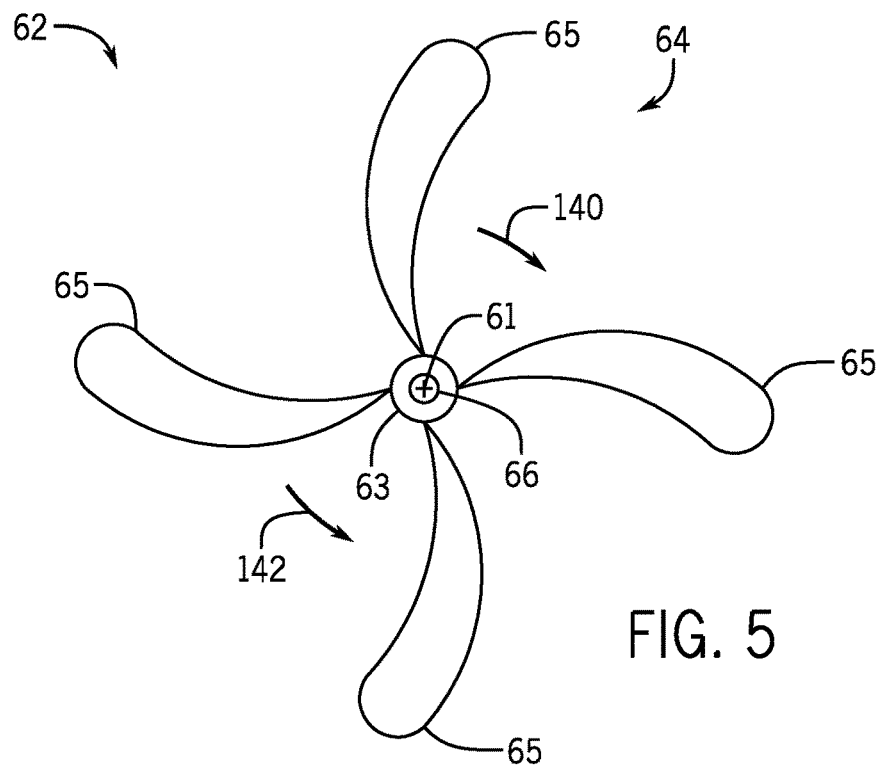
FIG. 5 is a schematic front view of an embodiment of a turbine of the turbine generator of FIG. 2.

FIG. 5 is a front view of an embodiment of a turbine 64 of the turbine generator 62 having the blades 65 positioned circumferentially about the rotational axis 61. The blades 65 are configured to rotate about the rotational axis 61 in a first direction 140 and/or a second direction 142 due to the kinetic energy of the gas from the gas supply 20. In certain embodiments, the blades 65 may include aerodynamic shaped bodies and edges (e.g., curved, cambered, and/or air foil shaped bodies and edges) to facilitate rotation of the blades 65. That is, the shape of the blades 65 may be particularly selected to enhance rotation about the rotational axis 61. For example, the blades 65 may be designed to operate within a range of pressures (e.g., a desired pressure range for the spray 14).

Moreover, the turbine 64 (including blades 65), the shaft 66, and/or any rotary or stationary components of the turbine generator 72 may be formed from lightweight materials to reduce the weight of the turbine generator 62. For example, the lightweight materials may include lightweight plastics, foams, alloy steels, aluminum, composite materials, and/or any other suitable lightweight materials. By further example, the composite materials may include a reinforcing material (e.g., particles, fibers, a mesh, a grid, or structures) distributed within a matrix material. The reinforcing material may include metal, plastic, fabric, ceramic, glass, carbon, aramid, basalt, or any combination thereof, while the matrix material may include plastics or polymers such as epoxy, vinylester, polyester thermosetting plastic, phenol formaldehyde resins, or any combination thereof. The composite materials may include carbon fiber reinforced polymer or glass reinforced plastic, for example.

Additionally, the turbine 64 (including blades 65), the shaft 66, and/or any rotary or stationary components of the turbine generator 72 may also include coating materials, such as wear resistant coatings, erosion resistant coatings, corrosion resistant coatings, hydrophobic coatings, hard coatings (e.g., greater hardness than underling material), low friction coatings, or any combination thereof. For example, the blades 65 may include hydrophobic coatings to reduce moisture (e.g., water) on the blades 65, thereby potentially improving the longevity of the blades 65. Moreover, the blades 65 may include other coatings to potentially reduce the impact of the operating temperature of the gas supply 20 and/or to reduce friction as the blades 65 rotate about the rotational axis 61. For example, the core of the turbine 64 (including blades 65), the shaft 66, and/or any rotary or stationary components of the turbine generator 72 may be made of a low specific weight material such as foam, while the coating encapsulates the core and provides strength, rigidity, and structural support for the core. The coating may include a metal, plastic, ceramic, or any combination thereof. For example, the coating may include a carbide coating (e.g., a tungsten carbide), an aluminum oxide coating, a ceramic coating, or any combination thereof.

Furthermore, while the illustrated embodiment includes 4 blades 65, in some embodiments there may be 1, 2, 3, 5, 6, 7, 8, 9, 10, or any suitable number of blades 65 to enhance operation of the turbine generator 62. For example, few blades 65 may be utilized to reduce the weight of the turbine generator 62. However, in certain embodiments, more blades 65 may be utilized to enable faster rotational speeds of the turbine generator 62, thereby increasing the power output. It will be appreciated that the number of blades 65, shape of the blades 65, material of construction of the blades 65, and pitch of the blades 65 may be particularly selected to accommodate anticipated operating conditions and/or to enhance operability of the turbine generator 62.

Figure 6:
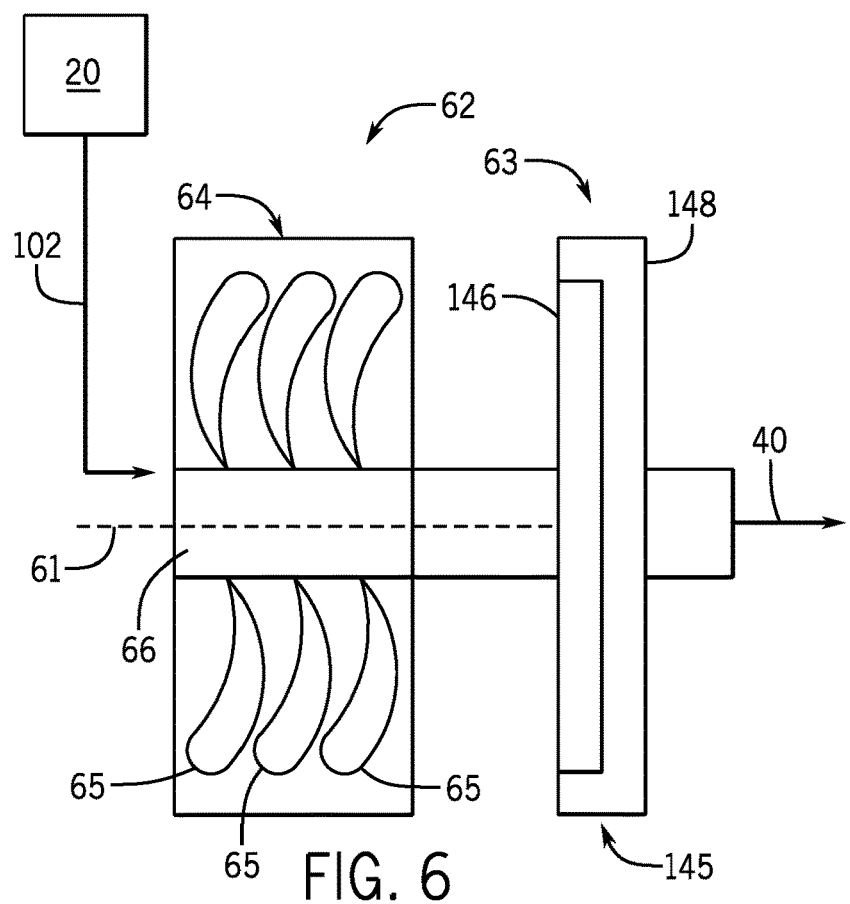
FIG. 6 is a schematic side view of an embodiment of the turbine generator of FIG. 2.

FIG. 6 is a schematic side view of an embodiment of the unit 62, which may functions as a turbine generator and/or a motor driven fan. In the following discussion, references is made to a turbine generator 62, yet the disclosure is intended to be applicable to a motor driven fan as well. In the illustrated embodiment, the turbine generator 62 includes the turbine 64 (including blades 65) coupled to the electrical generator 63 via the shaft 66. The illustrated turbine 64 includes first, second, and third stages of turbine blades 65 coupled to the shaft 66 and surrounded by a housing or shroud 144. The electrical generator 63 includes a rotor 146 disposed within a stator 148, wherein the rotor 146 is drivingly coupled to the shaft 66 and is driven by rotation caused by fluid passing through the stages of turbine blades 65 (i.e., rotation of the turbine 64). In certain embodiments, the stator 148 may be a permanent magnet, an electromagnet, or the like, while the rotor 146 acts as the field coil or field winding. As the rotor 146 rotates within the stator 148, an electrical charge (e.g., the power supply voltage 40) is generated. To that end, the gas supply 20 may be utilized to generate the electrical power to operate the spray tool 60 without connecting a hardwired power source (e.g., a power source connected to a municipal power grid or generator) and/or a battery pack. As mentioned above, in some embodiments, the turbine generator 62 may be a Pelton-type generator (e.g., an impulse turbine), a reaction turbine, a DC motor, an AC motor, or the like. The unit 62 also may operate as a motor driven fan, and thus the unit 63 may represent a motor (or motor generator) and the unit 64 may represent a fan (or fan-turbine). The rotor 146 and stator 148 may include any number and arrangement of windings to enable functioning as an electrical motor and/or an electrical generator. Thus, the power supply 26 may be described as having a plurality of blades 65 coupled to a rotor-stator assembly 145 having a plurality of windings, wherein the rotor-stator assembly 145 may be a motor, a generator, or a motor-generator that can selectively operate as a motor or a generator.

Figure 7:
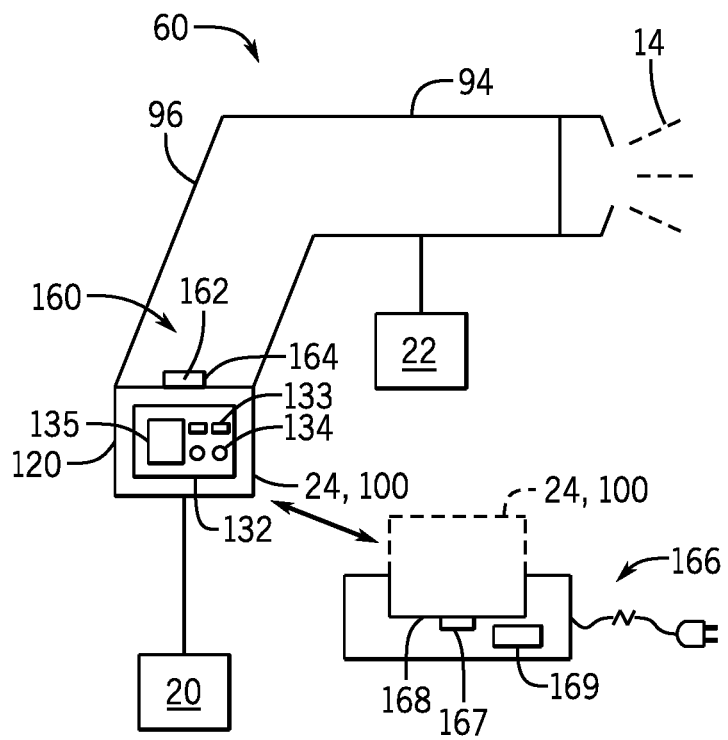
FIG. 7 is a schematic view of an embodiment of an electrostatic spray tool having a spray tool support module (e.g., a power module) coupled to a handle.

FIG. 7 is schematic side view of an embodiment of the spray tool 60, in which the power module 24, 100 is a modular component (e.g., a removable component) coupled to the handle 96 of the spray tool 60 via a handle mount (e.g., connector 160). In the illustrated embodiment, the power module 24, 100 is removably coupled or mounted to the handle 96 of the spray tool 60, e.g., a bottom of the handle 96, via one or more mounting features 69 (e.g., electro-mechanical connector 160). As shown, the connector 160 is a tongue and groove connector in which a tongue 162 is positioned on the power module 24, 100 and snaps and/or clips into a groove 164 formed in the handle 96. However, in some embodiments, the tongue 162 may be positioned on the handle and the groove 164 may be formed in the power module 24, 100. Furthermore, while the illustrated embodiment includes the tongue and groove connector, in some embodiments, the connector 160 may include a threaded connection, a bolted connection, an interference connector, a spliced connector, a clamped connector, a magnetic connector, or the like. Because the power module 24, 100 is coupled to the handle 96, in certain embodiments the housing 120 may be formed from lightweight material to enable mobility and manipulation of the handle 96 by the operator. For example, the housing 120 may be formed from injection molded plastics, composite materials, or the like.

Moreover, the connector 160 of the power module 24, 100 may be particularly selected to position the power module 100, such that interior passages (e.g., the output 130) are aligned with components positioned within the spray tool 60. For example, the output 130 may be aligned with the regulator 124 and/or the gas passage 78 to enable the gas supply 20 to enter the spray tool 60. Furthermore, in some embodiments, one or more sensors may be positioned within the power module 24, 100 and/or the spray tool 60 to determine whether the alignment of the power module 24, 100 to the spray tool 60 is in a desired orientation. For example, the sensors may relay a signal to the control system 48 while the power module 24, 100 is misaligned. Additionally, the control system 48 may instruct the indicators 134 to illuminate while the power module 24, 100 is misaligned. Accordingly, the power module 24, 100 may be removably attached to the handle 96 to provide electrical power to the spray tool 60 during operation.

As discussed above with reference to FIG. 2, the power module 24, 100 may include a power storage unit 67, such as one or more rechargeable batteries. The rechargeable batteries may be integrated with or removable from the power module 24, 100. The system 10 may include a power charger 166 having an electro-mechanical connector 167 in a charge receptacle or cradle 168, which is configured to receive the power module 24, 100 and connect with the electro-mechanical connector 160. In some embodiments, the power charger 166 may include an inductive charging assembly configured to charge the batteries of the power module 24, 100 wirelessly using an electromagnetic field. As illustrated, the power charger 166 includes an electrical cord configured to couple with an electrical outlet that receives power from the power grid. In some embodiments, the power charger 166 includes a power storage unit 67 (e.g., one or more rechargeable batteries) to provide charging at locations not having access to the power grid.

Figure 8:
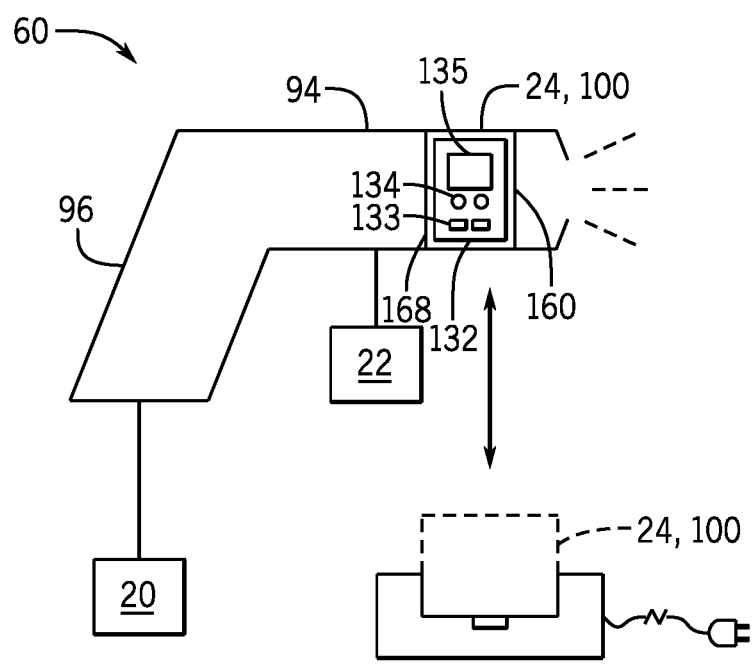
FIG. 8 is a schematic view of an embodiment of an electrostatic spray tool having a spray tool support module (e.g., a power module) coupled to a barrel.

FIG. 8 is a schematic side view of an embodiment of the spray tool 60 in which the power module 100 is coupled to the barrel 94 via a barrel mount (e.g., connector 160). As shown, the power module 100 is configured to couple to the barrel 94 (e.g., upstream of a nozzle or upstream of a cap) to supply electrical power to the spray tool 60 via the turbine generator 62. In the illustrated embodiment, the connector 160 enables attachment and removal of the power module 100 from the spray tool 60. Moreover, as described above, the power module 100 may be formed from lightweight materials to enable manipulation and movement of the spray tool 60.

Figure 9:
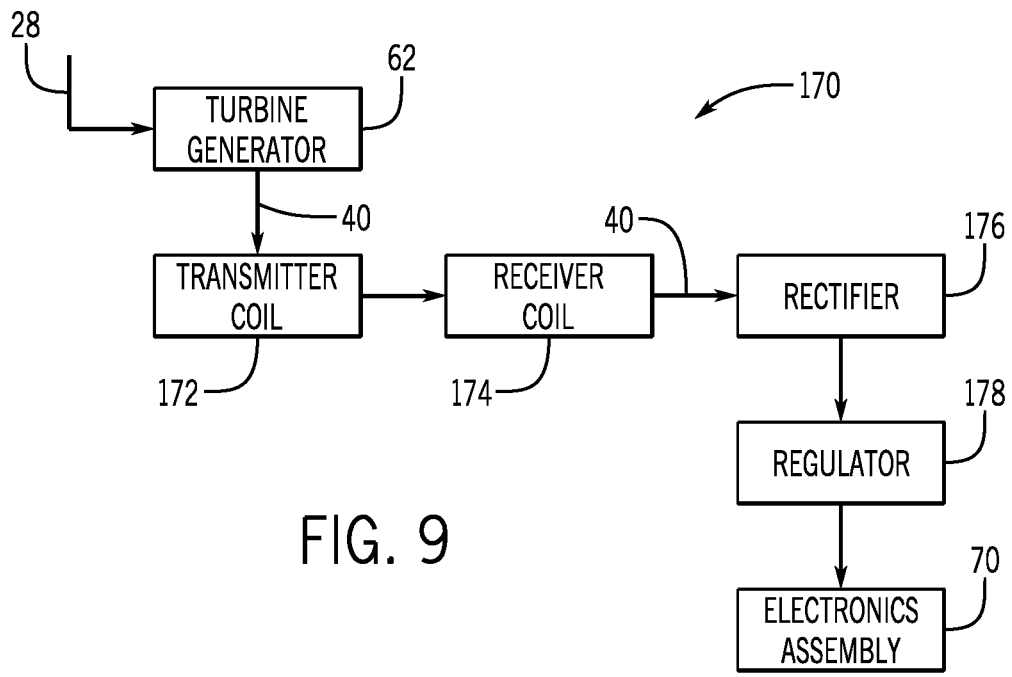
FIG. 9 is a block diagram of an embodiment of an inductive charging system.
Figure 10:
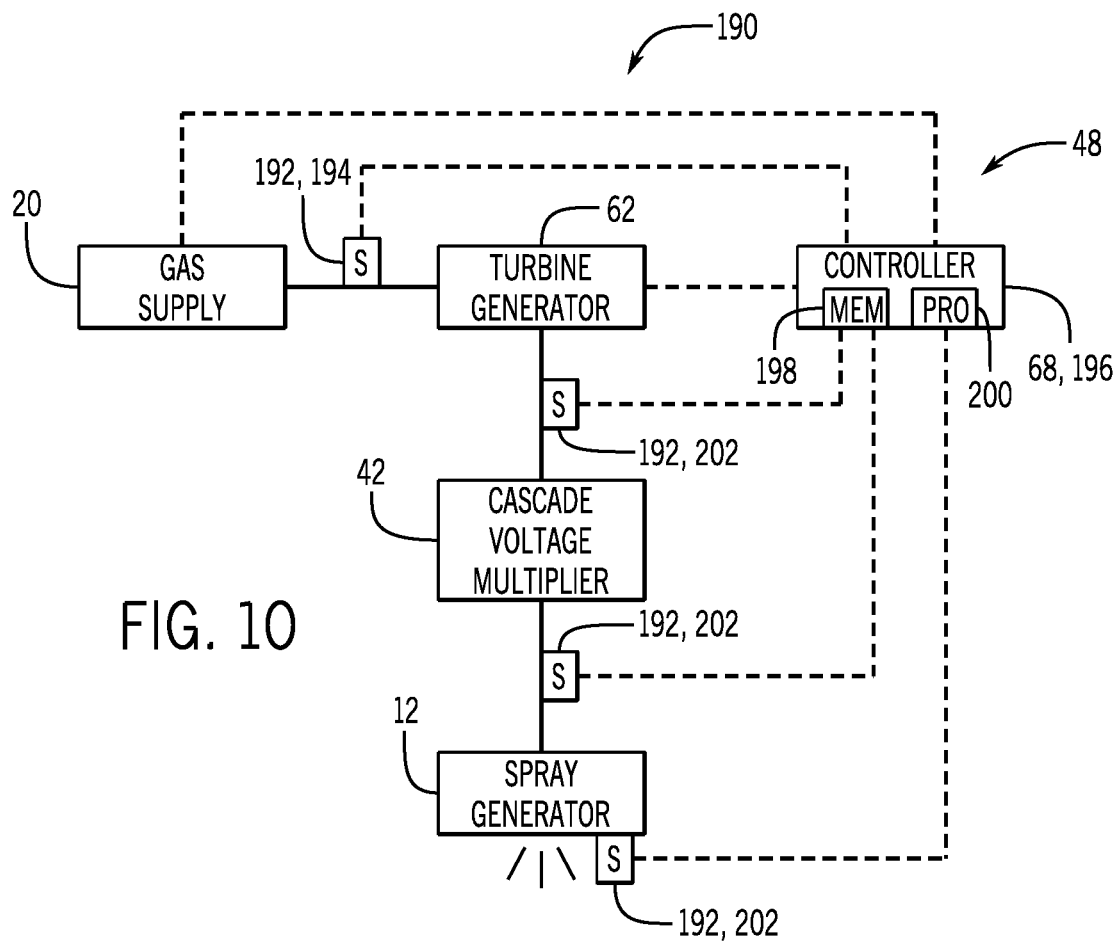
FIG. 10 is a block diagram of an embodiment of a turbine control system.

FIG. 9 is a block diagram of an embodiment of an inductive charging system 170 utilized to provide the power supply voltage 40 to the spray tool 60 (e.g., to the cascade voltage multiplier 42 of the spray tool 60, to the electronics assembly 72 of the spray tool 60). As described above, the turbine generator 62 is configured to receive the gas flow from the gas output 28 and to produce the power supply voltage 40 via rotation of the turbine 64 about the rotational axis 61. In the illustrated embodiment, the power supply voltage 40 is directed toward a transmitter coil 172. The transmitter coil 172 may be positioned on the turbine generator 62 (e.g., on a housing of the turbine generator). As will be appreciated, the transmitter coil 72 may be formed from a conductive material (e.g. copper) and configured to transmit the power supply voltage 40 wirelessly across a gap to a receiver coil 174 via inductive coupling. Thereafter, the power supply voltage 40 may be directed toward a rectifier

176, a regulator 178, and to the electronics assembly 72 and/or cascade voltage multiplier 42 for use during operation of the spray tool 60.

As mentioned above, the rectifier 176 may be utilized to convert an alternating current to a direct current. For example, in certain embodiments, the turbine generator 62 may provide an alternating current to the transmitter coil 172, thereby generating a magnetic field, which extends to the receiver coil 174. As a result, the energy from the turbine generator 62 may be transferred to the receiver coil 174, and to the electronics assembly 72 electrically coupled to the receiver coil 174. However, the electronics assembly 72 may utilize direct current for operational power. Therefore, the rectifier 174 may convert the alternating current to direct current. Moreover, the energy from the turbine generator 62 may be controlled via the regulator 178. For example, the energy may be stepped down or throttled to enable downstream electronics to utilize the power supply voltage 40 from the turbine generator 62. By utilizing the inductive charging system 170, physical connections between the associated power circuitry may be reduced, thereby decreasing the possibility of wear and/or degradation. Moreover, in embodiments where the power module 100 is a modular component, alignment and transfer of the power supply voltage 40 may be improved because the inductive charging system 170 does not utilize a direct connection between the coils 172, 174 to transfer power from the power module 100 to the spray tool 60.

FIG. 10 is a block diagram of an embodiment of a turbine control system 190, in which sensors 192 are utilized to monitor parameters of the gas supply 20 and/or the power supply voltage 40 to control the power generated by the turbine generator 62. For example, in the illustrated embodiment, a gas flow sensor 194 is configured to monitor the gas flow from the gas output 28 of the gas supply 20 to the turbine generator 62. In certain embodiments, the turbine 64 may be configured to rotate about the rotational axis 61 faster due to a larger quantity of the gas output 28 driving the turbine 64. As a result, different flow rates from the gas supply 20 may influence the amount of the power supply voltage 40 generated by the turbine generator 62. In the illustrated embodiment, the gas flow sensor 194 is communicatively coupled to the control system 48. As shown, the control system 48 includes a controller 196 (e.g., an electronic controller such as controller 68) having a memory 198 and a processor 200. The memory 198 may be a mass storage device, a FLASH memory device, removable memory, or any other non-transitory computer-readable medium (e.g., not only a signal). Additionally and/or alternatively, the instructions may be stored in an additional suitable article of manufacture that includes at least one tangible, non-transitory computer-readable medium that at least collectively stores these instructions or routines in a manner similar to the memory 198 as described above. The controller 68, 196 may be configured to receive signals from the sensors 192, 194 indicative of operating parameters of the electrostatic spray tool system 10 (e.g., gas flow rate, voltage, power consumption, turbine rotation speed). The signals may be evaluated by the processor 200 utilizing instructions stored on the memory 198. Additionally, the controller 68, 196 may send signals to various components of the electrostatic spray tool system 10 (e.g., the gas supply 20, the cascade voltage multiplier 42, power module 24, etc.) to adjust operating conditions of the electrostatic spray tool system 10 based on the signals received from the sensors 192.

Moreover, the controller 196 may utilize information from a variety of sensors 192 to modify operating parameters of the electrostatic spray tool system 10. For example, a voltage sensor 202 may be positioned between the turbine generator 62 and the cascade voltage multiplier 42 to monitor the multiplied power 44 from the cascade voltage multiplier 42. In certain embodiments, the controller 196 receives a signal from the voltage sensor 202 indicative of the value of the power supply voltage 40. The memory 198 may include a threshold value corresponding to a minimum and/or maximum voltage value of the power supply voltage 40 to operate components of the spray tool 60, charge the spray 14, or the like. In embodiments where the value of the power supply voltage 40 is less than desired (e.g., below the threshold), the controller 196 may output a signal to the gas supply 20 (e.g., to a compressor) to increase the gas flow from the gas output 28 toward the gas turbine 62, thereby speeding up the gas turbine 62 to induce the gas turbine 62 to generate more power. Moreover, in some embodiments, the voltage sensors 202 may be positioned downstream of the cascade voltage multiplier 42 and/or downstream of the spray generator 12. Accordingly, the power supply voltage 40 may be monitored at several locations to determine whether the turbine generator 62 is outputting a desired level of power.

Additionally, in certain embodiments, the sensors 192 may be configured to determine the mode of operation of the spray tool 60. That is, the sensors 192 and the control system 48 may be utilized to determine whether the spray tool 60 is operating in a current controlled or voltage controlled state. For example, in embodiments where the material output 30 is a liquid, the cascade voltage multiplier 42 may operate in the voltage controlled state. In other words, the output from the turbine generator 62 may be converted to voltage, and the cascade voltage multiplier 42 may be controlled by the amount of voltage supplied thereto. As a result, disturbances and/or surges in the voltage output may result in undesirable sprays 14. By monitoring the power supply voltage 40 and/or the multiplied power 44 via the sensors 192, adjustments to the turbine generator 62 (e.g., slowing or speeding down the turbine 64) may enable changes and control of the spray 14 via adjustment to the cascade voltage multiplier 42. However, in some embodiments, the spray tool 60 may operate in the current controlled state. For example, in embodiments where the material output 30 is a solid particulate material (e.g., powder), the cascade voltage multiplier 42 may operate in the current controlled state. In other words, the output from the turbine generator 62 may be converted to a controlled current (e.g., via the rectifier 176) that may be adjusted to alter operation of the spray tool 60. For example, the controller 196 may monitor the spray 14 via the sensors 192 and determine that a higher current to the cascade voltage multiplier 42 would provide desirable spray conditions. As a result, the controller 196 may output a signal to the gas supply 20 to increase the gas output 28 to the turbine generator 62, thereby increasing the output from the turbine generator 62. Moreover, in some embodiments, the controller 196 may output signals to the rectifier 176, the regulator 178, or any other component of the electrostatic spray tool system 10 to adjust operation of the spray tool 60.

As described in detail above, the turbine control system 190 is configured to monitor and regulate operation of the turbine generator 62 during operation of the electrostatic spray tool system 10. For example, in certain embodiments, the turbine generator 62 receives the gas flow from the gas output 28 of the gas supply 20 to drive the turbine 64 and produce electrical power (e.g., power supply voltage 40).

The turbine control system 190 may receive one or more signals from the sensors 192, 194, 202 positioned about the electrostatic spray tool system 10. For example, the sensors 192, 194 may send signals to the control system 190 indicative of a low power level for certain electrical components of the electrostatic spray tool system 10. As a result, the controller 190 may send a signal to the gas supply 20 (e.g., a compressor of the gas supply 20) to increase the gas output 28, thereby driving the turbine 64 to rotate faster and for the turbine generator 62 to produce more electrical power. As a result, the control system 190 may monitor the operation of the electrostatic spray tool system 10 and adjust operation of the turbine generator 62 to enable sufficient power to operate the electrostatic spray tool system 10.

Although the foregoing discussion contemplates a power module 24, 100 that is separate and/or removable from the electrostatic spray tool 60, some embodiments may permanently combine or integrate at least some portion of the power module 24, 100 into the electrostatic spray tool 60. Furthermore, this written description uses examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    an electrostatic spray tool, comprising:
        a turbine generator configured to generate electrical power to electrostatically charge a spray; and
        a controller configured to monitor the electrical power from the turbine generator and to instruct a gas supply to vary a gas flow to the turbine generator based on feedback received from one or more sensors.

2. The system of claim 1, comprising a power module having the turbine generator disposed within a user wearable structure.

3. The system of claim 2, wherein the power module comprises the controller and a user interface.

4. The system of claim 2, wherein the power module comprises a power storage unit.

5. The system of claim 4, comprising a charging unit having an inductive charging assembly configured to wirelessly charge the power storage unit.

6. The system of claim 4, wherein the turbine generator is configured to selectively operate as a motor driven fan using power stored in the power storage unit.

7. The system of claim 2, wherein the power module is removably coupled to the electrostatic spray tool.

8. The system of claim 7, wherein the power module comprises a handle mount configured to removably mount the power module to a handle of the electrostatic spray tool.

9. The system of claim 7, wherein the power module comprises a barrel mount configured to removably mount the power module to a barrel of the electrostatic spray tool.

10. The system of claim 1, wherein the feedback comprises a current, a voltage, a droplet size of spray, a transfer efficiency of spray, a distance to target object, or one or more environmental conditions.

11. The system of claim 1, wherein the controller is configured to selectively operate the electrostatic spray tool in a current control mode or a voltage control mode.

12. The system of claim 1, wherein the controller is configured to selectively operate the electrostatic spray tool in a liquid spray mode or a powder spray mode.

13. The system of claim 1, wherein the electrostatic spray tool comprises a cascade voltage multiplier configured to receive the electrical power from the turbine generator to electrostatically charge the spray.

14. The system of claim 1, wherein the electrostatic spray tool comprises an inductive charging system configured to wirelessly transmit the electrical power from the turbine generator to at least one electrical component of the electrostatic spray tool.

15. A system, comprising:
    a spray tool support module configured to support a spray tool, wherein the spray tool support module comprises:
        a power supply comprising a plurality of blades coupled to a rotor-stator assembly having a plurality of windings; and
        a controller coupled to the power supply, wherein the controller is configured to selectively operate the power supply in a turbine generator mode or a motor driven fan mode, a current control mode or a voltage control mode, a liquid spray mode or a powder spray mode, a sensor feedback control mode or a manual control mode, or any combination thereof.

16. The system of claim 15, wherein the controller is configured to selectively operate the power supply in the current control mode or the voltage control mode.

17. The system of claim 15, wherein the controller is configured to selectively operate the power supply in the liquid spray mode or the powder spray mode.

18. The system of claim 15, wherein the controller is configured to selectively operate the power supply in the sensor feedback control mode or the manual control mode.

19. The system of claim 15, wherein the controller is configured to selectively operate the power supply in the turbine generator mode or the motor driven fan mode.

20. The system of claim 19, wherein the rotor-stator assembly comprises a motor generator having the plurality of windings.

21. The system of claim 19, wherein the spray tool support module comprises a power storage unit.

22. The system of claim 15, wherein the spray tool support module comprises a user interface.

23. The system of claim 15, wherein the spray tool support module comprises a fluid output and a power output configured to couple to the spray tool.

24. The system of claim 15, wherein the controller is configured to control an electrostatic spray process of the spray tool.

25. The system of claim 15, wherein the controller is configured to monitor an electrical power generated by spray tool support module and instruct a fluid supply to vary a fluid flow to the spray tool support module based on feedback received from one or more sensors.

26. The system of claim 15, comprising the spray tool, wherein the spray tool comprises a powder spray tool.

* * * * *